United States Patent

[11] 3,588,682

[72] Inventor Friedrich M. O. Forster
Der Schoene Weg 144, 741 Reutlingen,
Germany
[21] Appl. No. 686,194
[22] Filed Nov. 28, 1967
[45] Patented June 28, 1971

[54] A SYSTEM FOR INSPECTING A WELDED SEAM WITH MEANS FOR GENERATING A SIGNAL WHICH IS A FUNCTION OF THE WELDING TEMPERATURE
10 Claims, 4 Drawing Figs.

[52] U.S. Cl. .................................................... 324/37
[51] Int. Cl. ................................................ G01r 33/12
[50] Field of Search ........................................... 324/37, 40

[56] References Cited
UNITED STATES PATENTS

| | | | |
|---|---|---|---|
| 1,946,196 | 2/1934 | Drake et al. | 324/37 |
| 2,729,785 | 1/1956 | Keevil | 324/37 |
| 3,268,805 | 8/1966 | Normando | 324/37 |
| 3,271,664 | 9/1966 | Mountz et al. | 324/37 |
| 3,346,807 | 10/1967 | Wood et al. | 324/37 |
| 3,401,332 | 9/1968 | McClurg et al. | 324/37 |
| 3,430,134 | 2/1969 | Flaherty et al. | 324/40 |

FOREIGN PATENTS
706,522 3/1965 Canada .................. 324/37

Primary Examiner—Rudolph V. Rolinec
Assistant Examiner—R. J. Corcoran
Attorney—Dan R. Sadler ABSTRACT: The present invention relates to nondestructive testing and more particularly to means for locating defects in a workpiece, such as welded pipe, determining whether or not the defect is unacceptable and indicating the characteristics and location of such defects. A search unit having a spinning disc or rotor is disposed adjacent the workpiece so as to scan along an inspection area on the workpiece. A first pickup probe on the rotor senses any stray magnetic fields produced by any inside or outside defects, such as cracks, together with means to indicate the size and location of the defect. A second pickup probe on the rotor scans the workpiece and senses the magnetic fields reradiated from the eddy currents induced in the surface of the workpiece. Means are coupled to the two probes and responsive to the signals therefrom to maintain the search unit correctly centered over the inspection area, to determine various characteristics of the workpiece and indicate when unacceptable defects are present.

Friedrich M. O. Förster,
INVENTOR.
BY.

ATTORNEY.

A SYSTEM FOR INSPECTING A WELDED SEAM WITH MEANS FOR GENERATING A SIGNAL WHICH IS A FUNCTION OF THE WELDING TEMPERATURE

If a workpiece is magnetized, magnetic stray flux fields are produced adjacent the outside surface. If the workpiece is homogenous and free from any discontinuities the magnetic field adjacent the surface of the workpiece is also essentially homogenous and free from any discontinuities. However, if there is a discontinuity, such as a crack, void, inclusion, etc., there is also a corresponding disturbance in the stray field above the surface of the workpiece. This is true whether the discontinuity is deep within the workpiece or near the outside surface. In one form of so-called magnetic nondestructive testing system, the workpiece is scanned by a pickup probe effective to produce signals corresponding to the stray field. By sensing variations in the signals it is possible to locate and identify defects.

In addition to determining whether or not there are any defects present, it is desirable to determine whether it is small enough to be within an acceptable range or is so large as to require rejecting the workpiece. It is also desirable to indicate the location of the defect, i.e. whether it is in the surface or buried inside of the workpiece.

The magnitude of the stray field and the variations in the signal from the probe are functions of the size and the depth of the defect below the surface. The field from a surface crack may be several times greater than the field from subsurface cracks. Moreover, the intensity of the stray field as sensed by the probe is dependent upon the position of the probe relative to the test area of the workpiece being scanned and some of the immaterial characteristics of the test. Accordingly, it has been extremely difficult, if not impossible, to determine the size of a discontinuity or its location by merely measuring the intensity of the stray flux field. For example, a relatively small and acceptable discontinuity on the exterior surface may produce a stray field that is much greater than a very large and unacceptable defect buried deep within the workpiece.

Although prior magnetic testing systems are capable of locating defects, they have not been entirely satisfactory in automatically following a relatively narrow test area. This is particularly true when the workpiece and/or the test areas are not straight. They have also been inaccurate and/or unreliable in resolving the size and location of a defect, particularly when the defect may be at any depth beneath the surface.

The present invention provides means for overcoming the foregoing difficulties. More particularly, means are provided for inspecting a workpiece at high rates of speed along a predetermined inspection area and automatically determining the locations of any discontinuities indicating when they are greater than an acceptable size.

In the embodiment of the present invention disclosed herein this is accomplished by providing a search unit for scanning a workpiece along a particular test area, such as a welded seam. The search unit includes a spinning disc or rotor carrying a first probe for measuring the stray fields and a second probe for measuring eddy currents. A pair of channels are coupled to the two probes and are effective to adjust the position of the search unit relative to the test or inspection area whereby various portions of the signals are maintained balanced and the search unit properly aligned with the test area. In addition the channels include means effective to respond to a combination of signals from the two probes to indicate various characteristics of the test area such as whether there are any surface or subsurface defects present.

These and other features and advantages of the present invention will become apparent from the following detailed description of a single embodiment thereof, particularly when taken in connection with the accompanying drawings wherein like reference numerals refer to like parts and wherein.

Figure 1:
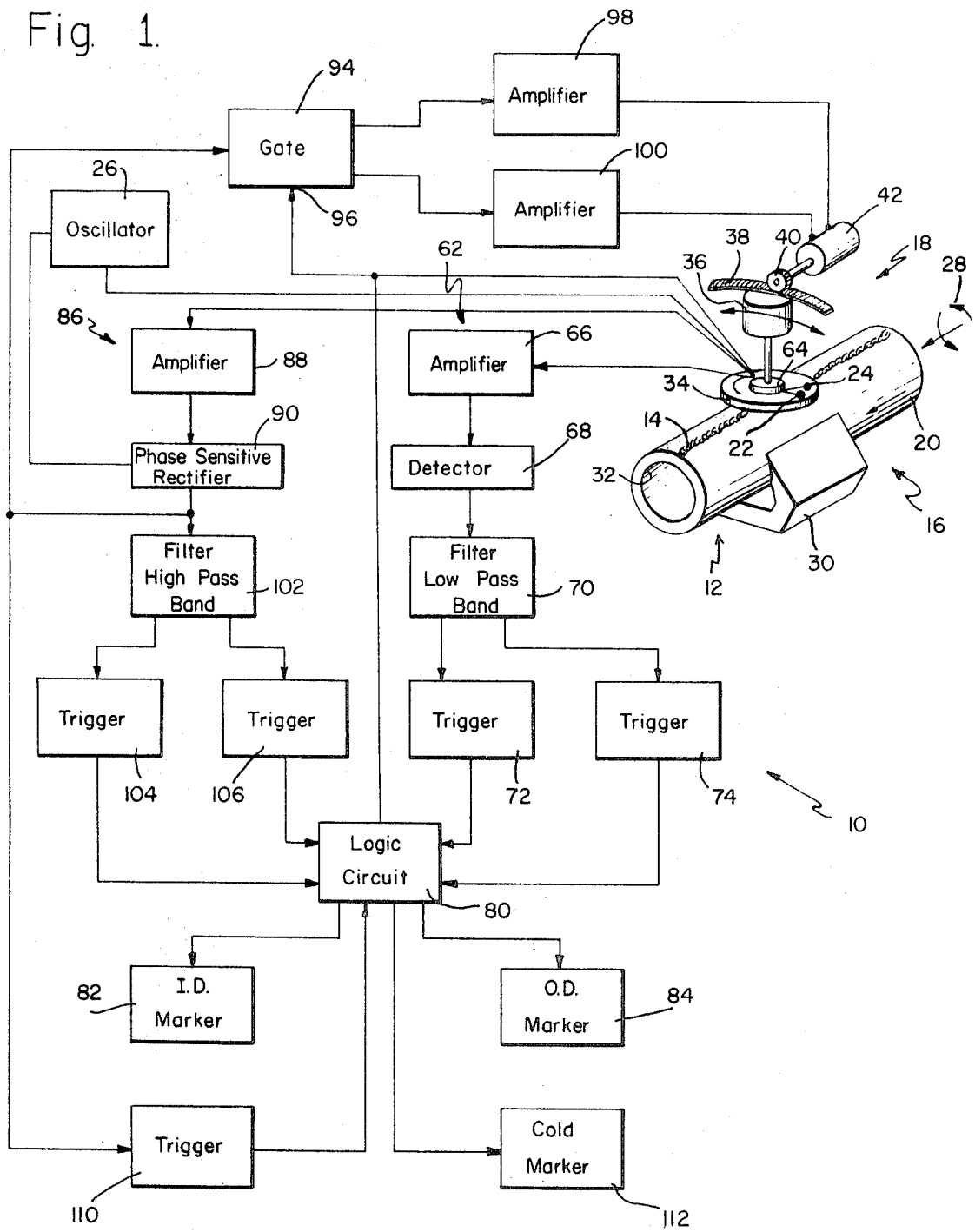
FIG. 1 is a block diagram of a nondestructive testing system embodying one form of the present invention and particularly adapted for inspecting welded pipe for internal and/or external defects in the weld.

Referring to the drawings in more detail and especially to FIG. 1, the present invention is particularly adapted to be embodied in the system 10 for nondestructively inspecting or testing workpieces for defects. Although the workpieces may be of any desired variety the present system 10 is particularly useful to inspect relatively long objects, such as bars, rods, etc.

The system 10 is designed for inspecting pipes 12 for internal and external defects and particularly for such defects in and around a welded seam 14. In one method of manufacturing welded pipe a strip of metal is folded, rolled or otherwise formed into a generally cylindrical shape. The adjacent edges are then welded together. If the weld is of uniform high quality it will be free of any discontinuities.

However, as a result of variations in the manufacturing process, such as improper welding, etc., the welded seam may include various types of defects, such as cracks, inclusions, etc. These defects in the weld may be in or near the outside surface and extend inwardly. They may also be in or near the inside surface and extend outwardly.

If a crack is small or of a minor magnitude it may not be of a serious nature, particularly if the pipe is to be only lightly stressed. Accordingly, such minor cracks do not necessitate repairing the welded seam or discarding the pipe. However, if a crack exceeds some predetermined depth there is a high probability of a failure and the crack must be repaired or the pipe discarded. According to one standard if the depth of a crack exceeds a depth of 12½ percent of the thickness of the wall, the crack is a serious and objectionable defect. Accordingly, to be commercially attractive it is highly desirable for the inspection system 10 to be capable of locating defects, determining whether they are within acceptable limits and indicate the location and nature of any defects which must be repaired. The present system provides means for accomplishing this.

The present system 10 includes an inspection station 16 through which the pipe 12 travels as it is being inspected. By way of example, the inspection station 16 may be disposed in or near a conveyor which carries the pipe 12 in an axial direction. The inspection station 16 includes a search unit 18 for scanning the pipe 12 as it advances through the station 16.

The search unit 18 may be of any desired variety and may scan the pipe 12 in any desired pattern. For example, if it is necessary to inspect the entire pipe the search unit may revolve completely around the pipe or the pipe rotate past the search unit whereby the total exterior surface 20 is inspected in a generally spiral pattern. However, in the present instance it is only desired to inspect the quality of the welded seam 14. Accordingly the search unit 18 is mounted to just travel across the area of the welded seam 14 (i.e. the top as seen in FIG. 1).

Although the search unit 18 may be effective to inspect the pipe by any suitable means, in this system 10 the stray magnetic fields and the reradiated eddy current fields are measured. Accordingly, the search unit may include a first pickup probe 22 for measuring the stray magnetic field and a second pickup probe 24 for measuring the eddy currents.

The first or magnetic probe 22 may be of the variety disclosed and claimed in copending applications Ser. No. 661,458 filed Aug. 17, 1967 and Ser. No. 644,961, filed June 9, 1967 in the name of Friedrich M.O. Forster. In a probe 22 of this nature a driving signal from an oscillator 26, or similar device, is coupled to the probe 22 and a second harmonic signal is then produced which has an amplitude corresponding to the flux density of the stray field.

The second or eddy current probe 24 may be of the variety disclosed and claimed in copending application Ser. No. 641,658, filed May 26, 1967 in the name of Friedrich M.O. Forster. In a probe of this nature a driving signal from the oscillator 26, or similar source, is coupled to the probe 24 whereby an alternating field is radiated into the workpiece and induces eddy currents in the workpiece. These currents circulate in or on the surface in patterns corresponding to the characteristics of the surface. The probe senses the magnetic fields reradiated by the currents and produces a corresponding signal. This signal has the same frequency as the driving signal from the oscillator and the eddy currents. The amplitude and phase of the signal are modulated as a function of the characteristics of the surface of the workpiece.

In order to provide suitable stray magnetic fields around the region of the welded seam 14, it is desirable to produce a magnetic flux field within the pipe 12 which extends transversely across the welded seam 14. This may be accomplished by circulating an electric current axially through the pipe 12 so as to produce a concentric magnetic field as indicated ky the arrows 28.

In this embodiment a magnetic field is produced by a magnetic yoke 30 having pole faces disposed adjacent the pipe 12 on the opposite sides of the welded seam. This produces a magnetic field which extends across the top of the pipe 12 and transversely through the weld 14. If there is a crack in the weld extending in a generally longitudinal direction, a stray field is produced above the outside of the pipe 12 just above the welded seam 14.

The intensity and geometric size and shape of a stray field is a function of the size and shape of the crack. As the depth, width, etc. of the crack increases, the field increases correspondingly. If the crack is on the outside of the pipe, and particularly if it opens through the outside surface, the field has a relatively high flux density and has a small geometric shape. Such a field also has high field gradients. In contrast, if the crack is on the inside or near the inner surface 32 the stray field on the outside of the pipe has a considerably smaller flux density and low field gradients. Moreover, the field has a considerably broader geometric shape spread across a wider area of the surface 20.

The search unit 18 includes a disc or turntable 34 upon which the probes 22 and 24 are mounted. The turntable 34 is disposed immediately above the weld 14 and is driven by an electric motor 36. As the turntable 34 rotates the probes 22 and 24 are scanned across the welded seam 14 and through the stray field.

The turntable 34 should be substantially parallel to a tangent through the weld 14 whereby the scan lines followed by the probes 22 and 24 are substantially symmetrical to the weld 14. If the pipe 12 and the welded seam 14 are completely straight, the motor 36 and turntable 34 can be permanently mounted in a fixed position. However, as a practical matter the pipe and/or the weld are frequently not in a true straight line but follow a somewhat irregular path. Under these circumstances it is preferable to mount the motor 36 and turntable 34 for movement around the center of the pipe 12 whereby the turntable 34 is maintained in the desired tangential relationship. In the present instance this is accomplished by means of a rack 38 and pinion 40 driven by a reversible electric motor 42. As described in more detail subsequently, this automatically maintains the turntable 34 symmetrically disposed over the welded seam 14.

As the turntable 34 rotates and carries the probes 22 and 24 across the welded seam 14 they will produce a sequence of signals corresponding to the characteristics of the weld 14. If there is a crack in the weld, each time the first probe 22 passes over the crack it will pass through the resultant stray field and produce a pulse having an amplitude corresponding to the curves 44 and 46 in FIG. 2. The probe 24 also produces signals corresponding to curves 52 and 54 in FIG. 3A as it passes over the seam 14 in FIG. 3B. If there is a crack in the seam a pulse is superimposed on the curve 52 or 54. These pulses have amplitudes corresponding to the curves 48 and 50 in FIG. 2.

Figure 2:
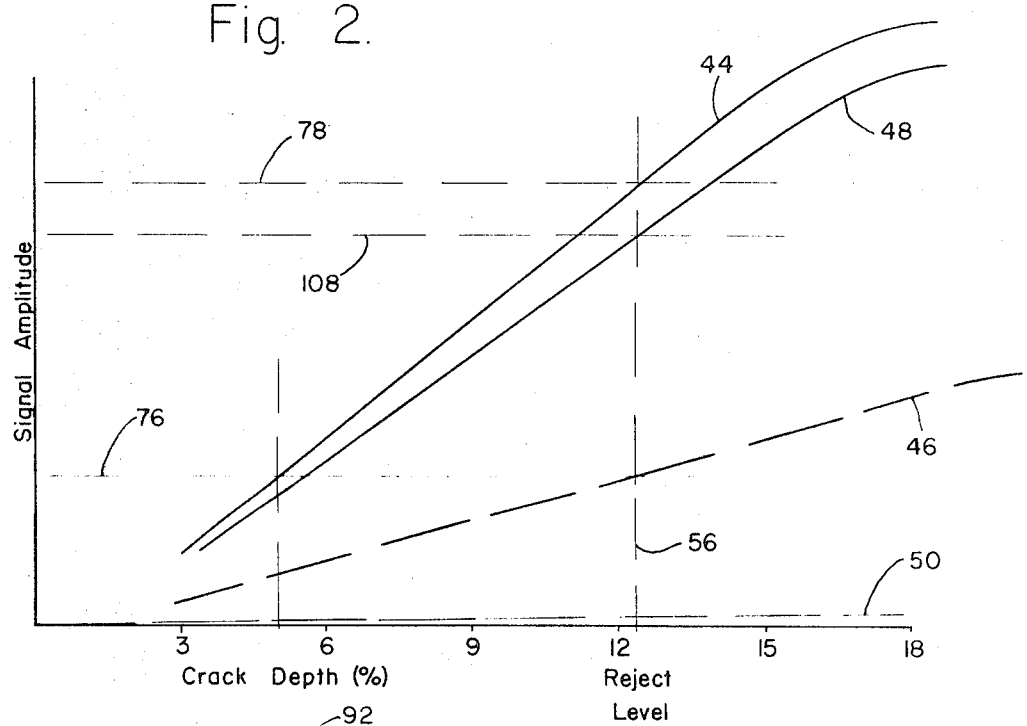
FIG. 2 is a graph of certain operating characteristics of the present system.

Since the stray field from an inside crack has a lower flux density and geometrically larger shape, the signal from an outside crack will be considerably greater than for an inside crack and it will contain a considerably greater proportion of high frequency components. Typically the amplitude of the outside signal will be on the order of at least 2 or 3 times as great as the inside signal. Assume the reject level 56 corresponds to a crack depth of 12½ percent (FIG. 2). The signal resulting from a relatively minor outside crack of say 5 or 6 percent will be greater than the reject level 56 and will correspond to a signal from a major inside crack in excess of say 15 percent.

A crack in the outside surface produces a large eddy current signal. However, the eddy currents are confined almost entirely to the outside surface and an inside crack will have very little, if any, effect upon the eddy currents. In actual practice the curve 50 should be along or very close to the zero level for all crack depths.

During the welding process the metal in the seam and immediately adjacent each side thereof is heated to relatively high temperatures. In fact, at least a portion of the metal in the seam 14 is melted. During the cooling process the metal in the weld and on both sides thereof are annealed. The amount of annealing is a function of the temperature rise and is greatest along the center line of the seam.

Figure 3A:
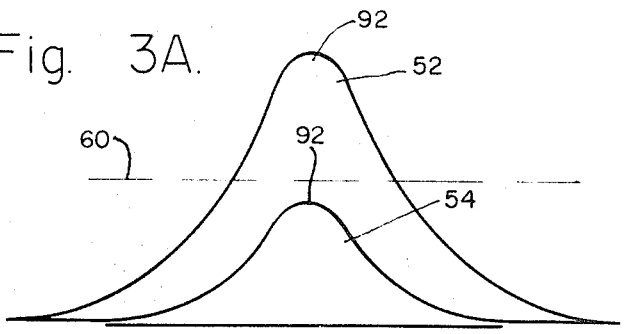
FIG. 3A & 3B are a cross-sectional view of a fragment of a welded pipe and a graph of certain response characteristics of the system when inspecting the welded seam in such a pipe.
Figure 3B:
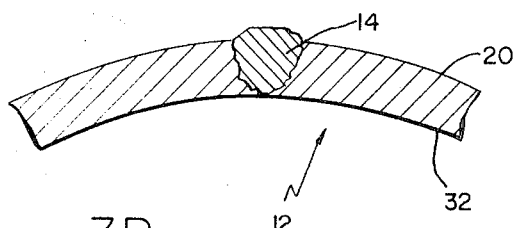

As best seen in FIGS. 3A and 3B as the probe 24 approaches the weld 14 the signal increases, reaches a maximum as the probe 24 passes over the seam 14 and then it decreases back to zero. In a high quality weld a considerable amount of annealing occurs and the signal 52 exceeds a preset level 60. However in the event of a "cold weld" the temperature is not raised enough to produce a strong weld or a large amount of annealing. As a result the signal 54 never reaches the present level 60. It should be noted the signals 52 and 54 of FIG. 3A are produced by a weld free of cracks, etc. In the event of a crack there will be a short duration pulse superimposed on the signal at the time the probe 24 passes over the crack.

The first or magnetic probe 22 is coupled to a magnetic channel 62. The coupling may be of any desired variety, such as a brush and slip ring, etc. However, in the present instance a rotary transformer 64 is used. This includes a rotating primary on the turntable 34 connected directly to the probe 22. A stationary secondary is disposed next to the primary and connected directly to the input of the magnetic channel 62. By employing a rotary transformer, sliding contacts, etc. are avoided whereby noises resembling defect signals are reduced.

The input to the magnetic channel 62 includes an amplifier 66. One of the primary purposes of this amplifier 66 is to increase the amplitude of the signal to a more useful level and to reduce the signal-to-nose ratio. The output of the amplifier 66 is coupled to rectifier or detector 68. As previously mentioned the probe 22 is driven by the oscillator 26 and produces a signal that is a second harmonic of the driving signal. The amplitude of the second harmonic signal is modulated by an envelope that is a function of the density of the stray magnetic field in which the probe 22 is disposed. It is the purpose of the detector 68 to remove this carrier and leave only a signal corresponding to the modulation envelope.

The output from the detector 68 is coupled to the input of a filter 70. The characteristics of this filter 70, of course, depends upon the nature of the system 10 and its various components, the scan rate, the types of information desired etc. However, generally the magnetic channel 62 is concerned with the detection of internal defects, such as cracks near the inside surface 32. As previously stated, signals of this variety are of a lower amplitude. Also they are produced by fields of somewhat broader geometric shape and lower gradients. As a result they have a considerable amount of lower frequency components.

The filter 70 is, therefore, normally of the low pass variety or has a passband that is in a lower range. It may be seen this filter 70 tends to favor the signals resulting from cracks in or near the inside surface by discriminating against the higher frequency signals produced by the outside defects. However, since the latter type of signal is of a large amplitude and does contain a considerable amount of low frequency components, there will still be a relatively large signal from the filter 70.

The filter 70 is coupled to the inputs of one or more trigger circuits. In the present instance a pair of separate trigger circuits 72 and 74 are shown. These circuits 72 and 74 may be of a conventional design having a threshold level at which they change their outputs from one level to the other for so long as the input is above the threshold.

The first trigger circuit 72 has a relatively low threshold level. Normally the threshold is set at the level 76 corresponding to the amplitude of a signal produced by a standard defect disposed on or near the inside surface 32. A standard defect is a defect which is on the dividing line between an acceptable discontinuity and an unacceptable defect. Referring to FIG. 2, this would correspond to a crack of say 12½ percent depth and a signal equal to or greater than the level 76. It should be noted relatively minor outside cracks of say 5 or 6 percent will produce signals in excess of the level 76 and cause the first trigger 72 to switch to the second state. As a result this trigger circuit 72 is normally maintained in the first state. Whenever the probe 22 passes through a stray field caused by an unacceptable crack on either the inside or outside, this trigger 72 will switch to the second state.

The second trigger circuit 74 is normally very similar to the first trigger circuit 72 except it has a somewhat higher threshold level. Normally this level is set to correspond to the signal produced by a standard defect on the outside surface 20. As a result this trigger 74 will switch to the second state only when an unacceptable outside crack occurs. It will not change states in response to minor outside cracks and even most of the major inside defects.

The two trigger circuits 72 and 74 are coupled to a logic circuit 80 which will be described in more detail subsequently in connection with the operation of this system. The logic circuit 80 is coupled to an inside marker 82 and an outside marker 84. These are effective to mark the pipe 12 to indicate the presence and locations of inside and/or outside defects. By way of example these markers may be paint spray guns to paint a first stripe of say red for an inside defect and a second stripe of say yellow for an outside defect.

The second or eddy current probe 24 is coupled to an eddy current channel 86 by means of rotary transformer 64. The input to this channel 86 includes an amplifier 88 which is effective to amplify the eddy current signal to a more useful level and to improve the signal-to-noise ratio. The output of the amplifier 88 is in turn coupled to a detector or a phase sensitive rectifier 90. As previously mentioned the second probe 24 is driven by the oscillator 26 so as to radiate a magnetic field into the surface of the pipe and create eddy currents. The currents reradiate a field back to the probe 24. The flux density, phase angle, etc. of the field are functions of the characteristics of the surface.

The probe 24 receives the reradiated fields and produces signals having a carrier wave of the same frequency as the oscillator 26 and is phase and amplitude modulated. If the information contained in the phase modulation is not of interest a simple rectifier or detector may be employed to remove the carrier and leave only the amplitude modulated envelope. However, in the present instance, the phase modulation is of interest since it contains information as to the amount of annealing in and around the weld. Accordingly, a so-called phase controlled rectifier 90 is employed. This is coupled to the oscillator 26 so as to chop the eddy current signal in predetermined phase relation to the driving signal.

The signal from the phase controlled rectifier 90 resembles the signal in FIG. 3A. This signal increases in amplitude as the probe 24 approaches the weld 14, reaches a peak 92 as the probe 24 passes over the centerline of the weld 14 and then decreases as the probe 24 retreats from the weld 14. The amplitude of the peak 92 is a function of the degree of heating of the weld, i.e. the amount of annealing.

The output of the phase controlled rectifier 90 may be coupled to a switch or gate 94 having a control input 96 and a pair of outputs coupled to amplifiers 98 and 100. The control input 96 may be of any suitable variety coupled to a source of a synchronizing signal. This source is responsive to the angular position of the turntable 34. For example it may include a stationary pickup coil adjacent the turntable 34 and a magnetic slug on the turntable. These are effective to produce a pulse whenever the eddy current probe 24 passes through center, i.e. moves over the centerline of the weld. As the probe 24 approaches the centerline the gate 94 remains in a first condition and couples the signal to the first amplifier 98. When the probe 24 passes over the centerline the sync signal occurs, the gate 94 reverses its condition and couples the signal to the second amplifier 100.

The two amplifiers 98 and 100 are preferably of the integrating variety wherein the signal on the output is a function of the integral of the signal on the input. The two amplifier 98 and 100 are coupled to the reversible motor 42 so as to control its operation. The motor 42 is effective to drive the pinion 40 and rack 38 so as to rotate the plane of the turntable 34 relative to the pipe 12 until the signals from the amplifiers 98 and 100 are equal. This condition exists when the sync signal occurs coincident with the peak 92 of the signal. It may be seen this will insure the turntable 34 being maintained properly aligned with the seam 14 even though it may twist away from the top of the pipe 12.

The output of the phase control rectifier 90 is also coupled to a filter 102. The eddy current channel 86 is concerned primarily with the outside defects. In fact, as seen in FIG. 2, there will be no eddy current signals even though there may be an inside defect of great depth. As a result this filter 102 has a high band pass whereby only the higher frequency components, such as are produced by surface defects, are passed.

The output of the filter is in turn connected to a pair of triggers 104 and 106. These two triggers 104 and 106 are very similar to the preceding triggers 72 and 74 in the magnetic channel 62. The threshold level of the first trigger 104 is normally set just above the background noise. As a result whenever the eddy current probe 24 passes over a crack a signal is produced that trips the trigger 104 into the second condition. The second trigger 106 is normally set to a level 108 corresponding to the amplitude of a signal from a standard defect. It will be seen if an eddy current signal occurs corresponding to an acceptable defect the first trigger 104 will produce an output signal and in the event an eddy current signal occurs corresponding to an unacceptable defect, the first and second triggers 104 and 106 function. The output of the two triggers 104 and 106 are coupled to the logic circuit 80.

In order to use this system 10 a workpiece, such as the pipe 12, is moved axially through the inspection station 16. The field from the yoke 30 passes across the top of the pipe 12 and produces a transverse field in the weld 14. As the pipe 12 is fed axially through the inspection station 16 the turntable 34 rotates and carries the magnetic and eddy current probes 22 and 24 over the seam 14. The eddy current probe 24 travels over the welded seam 14 and produces a signal similar to FIG. 3A. This signal is detected in the phase controlled rectifier 90 and coupled to the gate 94. The gate 94 is switched by the 0 degree or sync signal whereby the eddy current signal is divided between the two amplifiers 98 and 100. These amplifiers 98 and 100 actuate the motor 42 in one direction or the other whereby the search unit 18 and particularly the turntable 34 are tilted into a substantially symmetrical position about the weld 14. As a result the turntable 34 will follow the seam even though the pipe 12 and/or seam 14 are not truly straight.

In addition the signal from the phase controlled rectifier 90 is coupled to the trigger 110 and the sync signal is coupled into the logic circuit 80. In the event the portion of the weld 14 being scanned is cold the peak 92 of the signal is too low to actuate the trigger 110. If the weld 14 was properly heated the peak 92 of the signal will rise above the level 60 and cause the trigger 110 to change states and couple a signal into the logic circuit 80. If a sync signal occurs while a signal is produced by the trigger 110 the weld 14 was adequately heated and the cold marker 112 will not be actuated. However, in the event the sync signal occurs but a signal is not produced by the trigger the weld was formed at too low a temperature and the logic circuit 80 will actuate the cold marker 112 to indicate this condition.

The large majority of welded seams 14 are free from defects. Accordingly, the signals from the magnetic and eddy current probes 22 and 24 are relatively small or on the order of any noise which may be present. As a result there will normally be no signals coupled to the triggers and neither of the markers 82 or 84 will be actuated.

In the event the portion of the seam 14 passing under the turntable 34 includes an outside defect or crack each time the eddy current and magnetic progress 22 and 24 pass over the crack, they produce separate signals. The signal from the magnetic probe 22 corresponds to the curve 44. Assume first that the crack is in an acceptable range, for example about 3 or 4 percent or less. Under these circumstances the magnetic signal is below the level 76 and neither of the trigger circuits 72 and 74 will be actuated. The eddy current signal will not be large enough to actuate either of the triggers 104 and 106. Accordingly, the logic circuit 80 will not actuate either of the markers 82 or 84. Assume there is an outside crack of an acceptable nature, but with a depth in excess of the dividing line of say 4 or 5 percent. The signal from the magnetic probe 22 will exceed the level 76 but not the level 78. The signal from the eddy current probe 24 will be above the background noise level (and the level 108) and cause the trigger 104 (and trigger 106) to produce a signal. Although the magnetic signal is above the lower level 76, an eddy current signal is present and will inhibit the logic circuit 80 from actuating the marker 82 and/or 84 and producing an indication of an inside and/or outside defect.

Next assume there is an outside crack that is deeper than the acceptable level, i.e. 12½ percent. The eddy current signal is now large enough to cause both of the trigger circuits 104 and 106 to switch. At the same time the magnetic signal 44 is above the level 78. As a result the logic circuit 80 will cause the outside marker 84 to be actuated. Since the trigger circuit 104 is actuated the logic circuit 80 will be inhibited from actuating the inside marker 82.

If there is a crack on or near the inside surface 32 the operation of the eddy current probe 24 will not be effected and no eddy current signal will be produced. Accordingly, neither of the triggers 104 nor 106 will be changed. The magnetic signals corresponds to the lower curve 46. If the crack is within an acceptable limit (i.e. less than 12½ percent depth) the signal will remain below the level 76 and neither of the triggers 72 nor 74 will be changed and neither of the markers 82 nor 84 will be actuated.

In the event the inside crack is in excess of the acceptable limit (i.e. greater than 12½ percent depth) the resultant signal will be above the limit 76. Since there are no eddy current signals, the logic circuit 80 knows there are no surface defects and it is inhibited from actuating the marker 84. However, it will respond to the magnetic signal and actuates the inside marker 82.

It will thus be seen that the present system 10 has the capability of simultaneously inspecting a pipe 12 and particularly a welded seam 14 therein for three different objectionable characteristics and distinctively mark the pipe 12 for each characteristic. First of all the system 10 can mark the pipe 12 to indicate at the time the weld was made it was not properly heated. Secondly, the system can detect outside cracks and if the crack is too large mark the pipe to indicate there is an outside defect. Thirdly, the system can detect inside cracks and distinguish them from outside cracks and mark the pipe to indicate the existence of an inside defect.

I claim:

1. A nondestructive testing system for inspecting a welded seam in a workpiece, said system including a search unit adapted to scan transversely across said seam and produce a signal having a portion thereof which is a function of the welding temperature of the seam, reference means coupled to said search unit and effective to produce a second signal during a reference interval which includes the time the search unit passes over the centerline of said seam, signal means coupled to the search unit and responsive to said portion of said first signal to provide a temperature signal which is a function of said welding temperature, and output means coupled to said signal means and said reference means, said output means being effective to produce an output signal which is a function of said temperature signal during said reference interval.

2. The nondestructive testing system of claim 1 wherein the search unit includes means effective to induce eddy currents on the surface of the workpiece in and around the welded seam and to receive the magnetic flux fields reradiated from said eddy currents whereby said portion of the first signal is a function of the amount of annealing in or around the seam, and the temperature signal from the signal means occurs substantially simultaneously with the search unit passing over the centerline of said seam.

3. The nondestructive testing system of claim 2 including indicator means effective to indicate a cold weld, trigger means coupled to said output means and responsive to the amplitude of the signal from the search unit, said trigger means being effective to produce a signal when the signal from the search unit exceeds a predetermined threshold level, and logic means coupled to the trigger means, to the reference means and to the indicator means, said logic means being effective to actuate said indicator means when the reference means produces a second signal and the trigger means does not produce a signal.

4. The nondestructive cold weld testing system of claim 2 including probe means in said search unit effective to induce eddy currents in the surface of the workpiece and receive the fields reradiated therefrom whereby said portion of the first signal is a function of the amount of annealing of said weld, indicator means coupled to said output means and effective to indicate a cold welded seam when the portion of the first signal occurring during the reference interval corresponds to an inadequate amount of annealing.

5. The nondestructive testing system for inspecting a welded seam in a workpiece, said system including a search unit adapted to be disposed adjacent said workpiece and to follow said seam, an eddy current pickup probe mounted in said search unit and effective to scan across the seam as the search unit follows the seam, said probe being effective to produce eddy currents on the surface of the workpiece in and around the welded seam, said probe being effective to receive the magnetic flux fields reradiated from said eddy currents and produce a signal corresponding to the characteristics of said seam, said signal including a portion which is a function of the amount of annealing of the workpiece as a result of the welding seam, signal means coupled to the pickup probe and effective to provide an annealing signal corresponding to said portion of the first signal, reference means effective to produce a reference signal when the probe travels through a center position wherein the probe should be centered over the seam, and output means responsive to the annealing signal from the signal means and the reference signal from the reference means to produce an error signal when the reference signal and the annealing signal do not occur simultaneously.

6. The nondestructive testing system of claim 5 including control means coupled to the output means and responsive to the error signal and coupled to the search unit, said control means being effective to move said search unit transversely over the centerline of said seam to maintain the error signal substantially equal to zero.

7. The nondestructive testing system of claim 6 wherein the search unit includes a rotor and the pickup probe is carried on the rotor.

8. The nondestructive testing system of claim 7 wherein the control means is effective to move the plane of said rotor whereby the axis of rotation is maintained normal to the surface of the workpiece as the search unit follows the seam.

9. A nondestructive testing system for inspecting the welded seam in a pipe including the combination of an inspection station through which said welded pipe passes,
   a rotor in said inspection station adapted to be disposed adjacent the welded seam in said pipe and scan said seam as the pipe passes through the inspection station, said rotor being adapted to rotate in a plane substantially normal to a radial through the seam,
   pickup probe means on said rotor effective to scan across the seam and produce a signal corresponding to the characteristics of said seam, said pickup probe means being effective to induce eddy currents in the workpiece and receive the fields reradiated by the currents whereby the signal includes a portion corresponding to the welding temperature,
   means responsive to the angular position of the rotor and effective to produce a reference signal when the probe means on the rotor passes through the center position, and
   the positioning means coupled to said rotor and responsive to said portion of the signal and the reference signal and effective to move the rotor around the pipe whereby said portion is substantially equally divided by the reference signal and said rotor is normal to the radial and centered over the seam.

10. A nondestructive testing system for inspecting the welded seam in a pipe including the combination of
   an inspection station through which said welded pipe passes,
   a rotor in said inspection station adapted to be disposed adjacent the welded seam in said pipe and scan said seam as the pipe passes through the inspection station, said rotor being adapted to rotate in a plane substantially normal to a radial through the seam,
   pickup probe means on said rotor effective to scan across the seam and produce a signal corresponding to the characteristics of said seam,
   said pickup probe means being effective to induce eddy currents in the workpiece and receive the fields reradiated by the currents whereby the signal includes a portion corresponding to the welding temperature,
   means responsive to the angular position of the rotor and effective to produce a reference signal when the probe means on the rotor passes through the center position,
   positioning means coupled to said rotor and responsive to said signal, said positioning means being effective to move the rotor around the pipe whereby said rotor is normal to the radial and centered over the seam, and
   means responsive to the amplitude of said portion of the signal and the reference signal and effective to produce an indication when cold weld is present.